United States Patent [19]

Dickinson et al.

[11] 3,853,523

[45] Dec. 10, 1974

[54] MANUFACTURE OF FLAT GLASS

[75] Inventors: George Alfred Dickinson, St. Helens; Frank Nixon, Billinge, both of England

[73] Assignee: Pilkington Brothers Limited, Liverpool, England

[22] Filed: June 15, 1972

[21] Appl. No.: 263,214

[30] Foreign Application Priority Data
July 9, 1971 Great Britain ............... 32454/71

[52] U.S. Cl. .................. 65/99 A, 65/182 R
[51] Int. Cl. ............................ C03b 18/02
[58] Field of Search..... 65/99 A, 182 R, 65 A, 65 R

[56] References Cited
UNITED STATES PATENTS

| | | | |
|---|---|---|---|
| 3,409,423 | 11/1968 | La Jarte | 65/65 A |
| 3,468,651 | 9/1969 | Boaz | 65/99 A X |
| 3,487,659 | 1/1970 | Kunihiko Ito et al. | 65/99 A X |
| 3,661,548 | 5/1972 | Ito et al. | 65/182 R |
| 3,684,471 | 8/1972 | Matsushita | 65/182 R |
| 3,713,797 | 1/1973 | Lawrenson | 65/99 A X |

Primary Examiner—S. Leon Bashore
Assistant Examiner—Kenneth M. Schor
Attorney, Agent, or Firm—Burns, Doane, Swecker & Mathis

[57] ABSTRACT

Flat glass in ribbon form is manufactured at an increased rate on a molten metal bath by pouring molten glass on to the bath continuously to feed a spreading layer of molten glass on the bath. Inwardly and forwardly directed forces are mechanically applied to the margins of the spread molten glass layer to regulate the extent of that spread as well as to accelerate the glass and impose a width reduction to retain a required thickness of ribbon despite the acceleration of the glass. This thickness is subsequently reduced by the effect of traction advancing the ribbon.

5 Claims, 2 Drawing Figures

MANUFACTURE OF FLAT GLASS

BACKGROUND OF THE INVENTION

This invention relates to the manufacture of flat glass by the float process in which molten glass is delivered at a controlled rate on to a bath of molten metal and the glass is advanced in ribbon form along the bath and cooled as it is advanced until it is sufficiently stiffened to be taken unharmed from the bath.

The need for increasing the throughput of glass through a float glass manufacturing installation designed for high load operation, for example a throughput of glass of from 3,000 tonnes per week to 4,200 tonnes per week, has necessitated increase in the speed of the ribbon of float glass discharged from the installation.

The resulting acceleration of the glass while it is still molten on the bath tends to cause undue reduction in ribbon width and thickness. Loss of ribbon width and thickness can be countered by increasing the rate of cooling of the glass as the ribbon of glass is being formed. Too high a cooling rate at the hot end of the bath has been found to introduce undesirable distortion into the glass.

It has also been found that when producing thinner float glass, for example 5 mm or 4 mm thick, under high load conditions, the ribbon width can be maintained by increasing the rate of delivery of molten glass to the bath, but as the speed of discharge of the ribbon is increased to accommodate the higher throughput there is a tendency for too great a reduction in ribbon thickness. This can be countered to a certain extent by hot end cooling.

However under high load conditions it has now been discovered that for each required glass thickness, at higher speeds than a certain speed of ribbon discharge an increase in the amount of hot end cooling is ineffective to retain the required thickness in the ribbon produced by the accelerating glass, and can be detrimental to the quality of the float glass product.

It is a main object of the present invention to provide an improved method of operating the float process under high load conditions, in which the use of coolers at the hot end of the bath is minimised.

The invention is based on the discovery that, under high load conditions, the molten glass can be accelerated as it is spreading on the molten metal bath, by forces which also serve to compensate for any tendency to excessive attenuation and thereby maintain the desired glass thickness even though the glass is being accelerated for discharge at high speed from the bath.

SUMMARY

Accordingly the invention provides a method and apparatus for manufacturing flat glass in ribbon form on a bath of molten metal, in which molten glass is delivered to the bath at a rate which develops an advancing layer of molten glass on the bath. This layer of molten glass is permitted to spread laterally on the bath and inwardly and forwardly directed forces are applied to the margins of the spread molten glass layer, by means of one or more pairs of top rolls whose axes converge towards the inlet end of the bath, to regulate the extent of that maximum spread, while at the same time accelerating the glass, and simultaneously imposing a controlled reduction in width on the forwardly flowing ribbon of glass which is effective to retain the glass at a thickness which is thereafter reduced to a required thickness by the influence of applied traction advancing the ribbon as it is cooled preparatory to discharge from the bath. The marginal forces may be applied at two locations spaced apart along the bath.

The acceleration of the spread molten glass is preferably to a speed which is less than the speed of discharge of the ultimate ribbon of glass from the bath, by an amount which ensures the required ribbon thickness is achieved. Further change in thickness of the glass following the acceleration of the glass is thereby controlled and the dimensions of the ribbon can be stabilised at a location relatively near to the inlet end of the bath so that the effective length of the bath and its containing tank structure and roof structure can be shortened.

The invention particularly provides a method of manufacturing float glass of thickness in the range 5.7 mm to 6.2 mm at high load.

DESCRIPTION OF THE PREFERRED EMBODIMENTS

Figure 1:
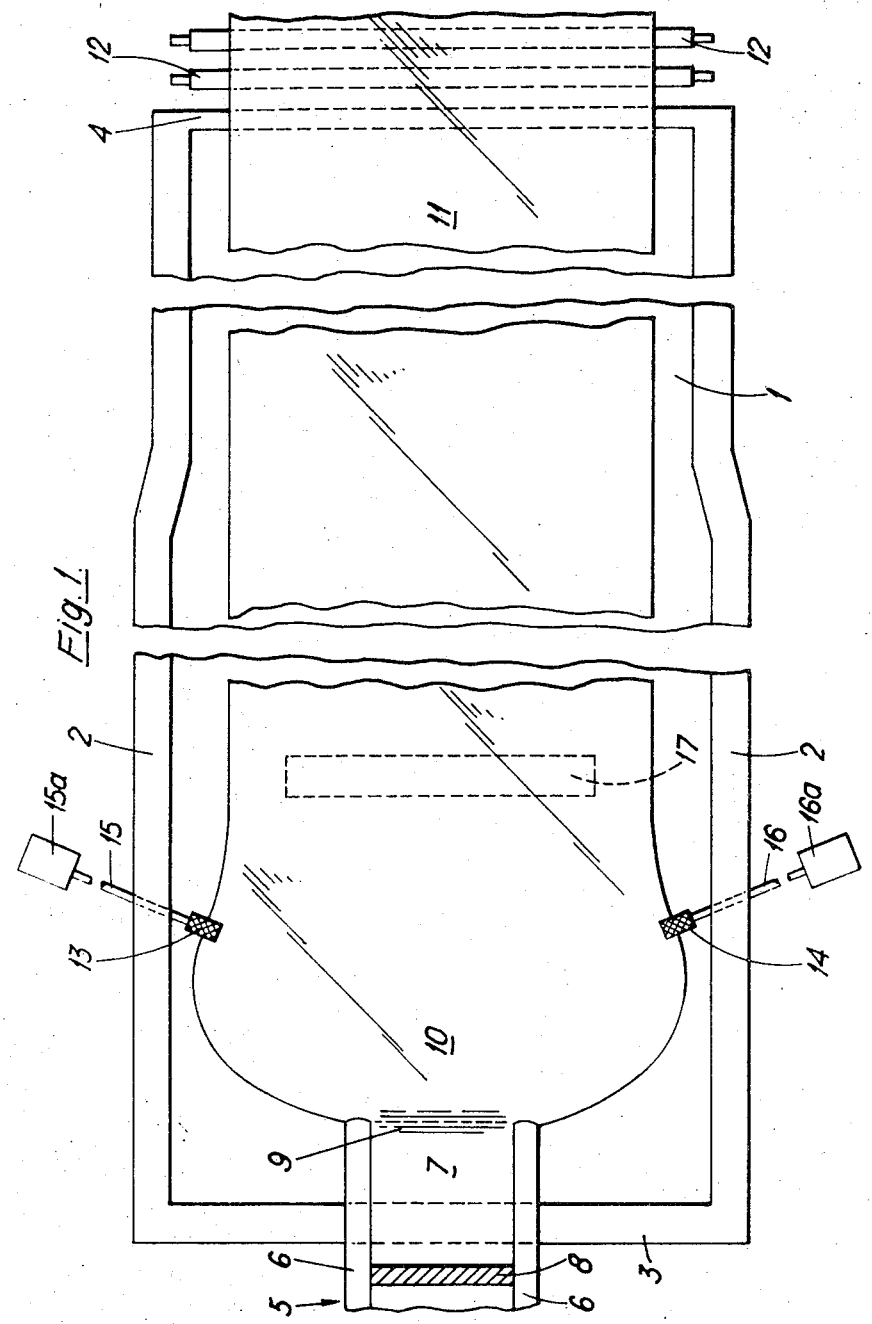
FIG. 1 illustrates in plan view a tank structure for operating the float process under high load conditions with the customary roof structure removed, and showing one pair of angled edge rolls bearing on the margins of the molten glass.

Referring to FIG. 1 a bath of molten metal 1 is contained in a tank comprising side walls 2, an end wall 3 at the inlet end of the structure and an end wall 4 at the outlet end. The bath of molten metal may be a bath of molten tin or of a tin alloy in which tin predominates, as is well known in the operation of the float process.

A spout 5 extends over the inlet end wall 3 and has side jambs 6 which define a channel along which molten glass 7 flows from the forehearth of a glass melting furnace. The flow of molten glass 7 along the spout at a temperature of 1,080°C is controlled by a tweel 8. The molten glass pours over the spout as indicated at 9 on to the surface of the bath 1 of molten metal at 1,050°C where the molten glass spreads laterally as it flows forwardly to form a layer of molten glass 10 on the bath which spreads laterally in the manner indicated in the drawing.

The tank structure in this embodiment will firstly be described with reference to the production of 6 mm glass at a load of 3,000 tonnes per week.

The molten glass in the layer 10 is advancing forwardly at a speed in the region of 170 m/hr. to 210 m/hr. The ultimate ribbon of float glass which is 6 mm thick is indicated at 11 and this ribbon 11 is discharged through an outlet over the end wall 4 of the tank structure by conveyor rollers 12, in known manner. The conveyor rollers 12 are driven at a rate such that the ribbon 11 is being discharged from the bath at a speed of 450 m/hr. The conveyor rollers 12 apply traction to the ultimate ribbon 11 and this traction is transmitted upstream of the ribbon by the stiffened part of the ribbon.

Inclined top rolls 13 and 14 are mounted on shafts 15 and 16 which extend through bearings in the side walls of the tank structure. The shafts 15 and 16 are located with their axes converging towards the inlet end of the bath. The rolls 13 and 14 have knurled perimeters and engage the margins of the upper surface of the molten glass just after the glass has achieved its spread. The shafts 15 and 16 are positioned at an angle of 12° to a line at right angles to the direction of advance of the ribbon of glass along the bath and are driven by driving means 15a, 16a of conventional kind at an angular speed which gives an effective forward speed of 355 m/hr. at each roll perimeter where they engage the margins of the ribbon of glass. The knurled surfaces of the rollers bite into the glass surface and the rolls thereby apply inwardly and forwardly directed forces to the margins of the molten glass layer immediately after its spread is achieved. The glass is accelerated by the action of the top rolls 13 and 14 assisted by the effect of traction applied by the conveyor rollers 12, to a forward speed more than twice the initial speed of the advancing layer 10 of molten glass on the bath. In order to maintain the glass thickness at the target at about 6 mm as the glass is accelerated, the effective inward angle of the applied forces is set by slewing the angle of the shafts 15 and 16 to an angle preferably in the range 5° to 15°, to impose a controlled reduction in width on the forwardly flowing ribbon of glass which is effective to retain the glass at a desired thickness which is thereafter reduced to the desired 6 mm thickness by the influence of the applied traction acting on the ribbon as it is advancing downstream of the top rolls 13 and 14.

The top rolls further regulate the extent of the maximum spread so that under the conditions imposed on the layer of molten glass 10 as it is advanced there is a rapid acceleration of the molten glass to a speed approaching the eventual ribbon speed soon after the molten glass has arrived on the surface of the bath. Thereby a high throughput of glass is possible without the glass spreading to the side walls 2 of the tank structure so that the extent of the spread of the molten glass on the bath is determined by the effect of the top rolls in imposing a controlled reduction in width on the forwardly accelerating glass as its ribbon form is being developed.

The ribbon of glass advancing just downstream of the top rolls 14 and 15 is moving at a forward speed of about 355 m/hr. or just above and further acceleration takes place to the speed of 450 m/hr. at which the ultimate ribbon of glass 11, which is 2.7 m wide and 6 mm thick, is discharged from the bath. The glass is cooling throughout its advance along the bath and the glass which arrives on the bath surface at a temperature of about 1,060°C has been cooled to about 920°C at the location of the top rolls 13 and 14 and thereafter may be rapidly cooled under the influence of overhead coolers indicated at 17 to a temperature of about 850°C, below which there will be little further dimensional change in the ribbon under the influence of attenuating forces which are acting on the glass in the region of the coolers 17.

In the cirumstance that the forward speed of the glass as it leaves the top rolls 13 and 14 is little different from the speed of discharge of the ultimate ribbon from the bath, the need for any special cooling as indicated at 17 may be obviated and the glass subjected to a usual gradual cooling regime until it is cooled to a temperature usually in the region of 600°C at which temperature the glass is discharged from the bath on to the conveyor rollers 12.

Figure 2:
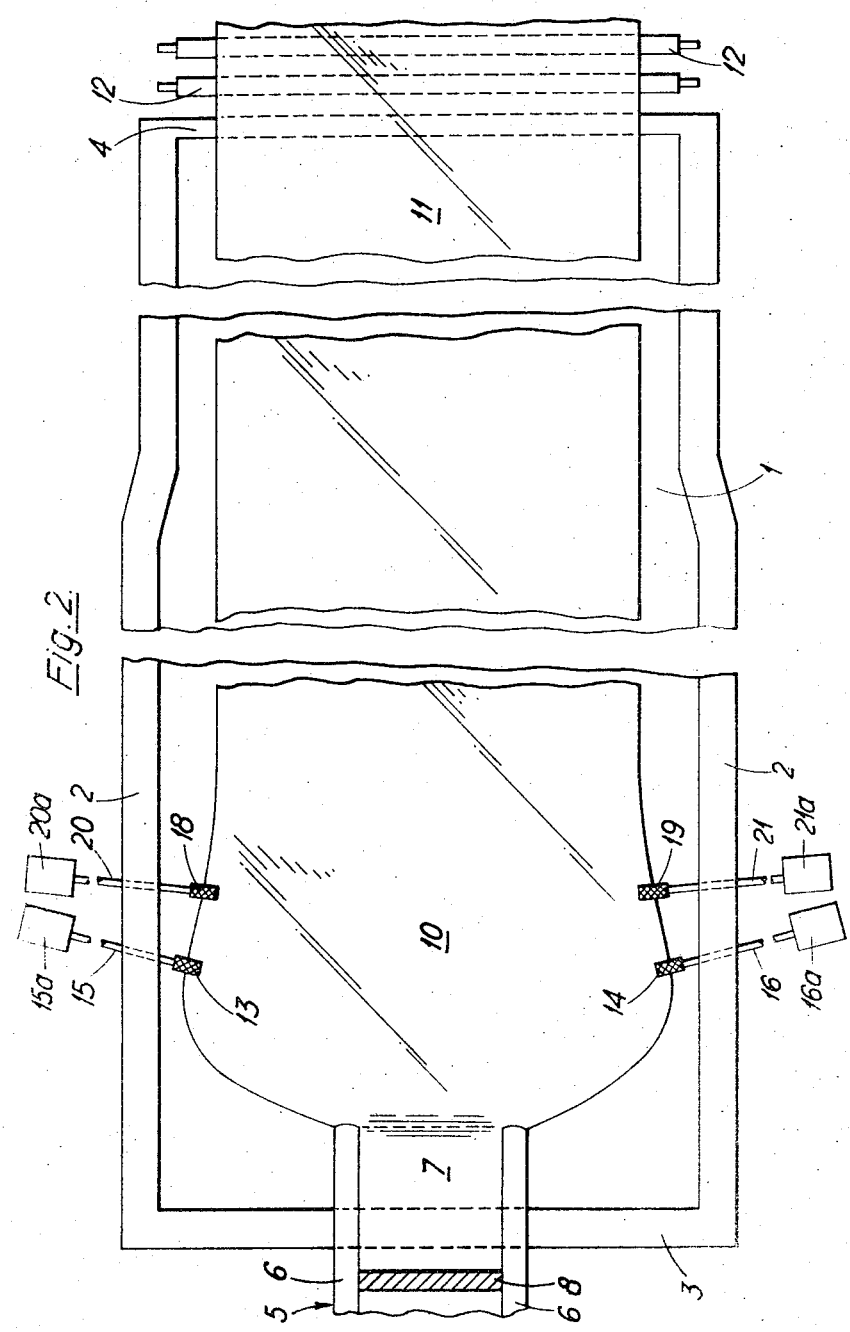
FIG. 2 is a view similar to FIG. 1 illustrating the operation of the process with two pairs of edge rolls.

Control of the reduction of ribbon width and thickness can be even further improved by the use of a second pair of top rolls 18 and 19 which are located just downstream of the top rolls 13 and 14, as shown in FIG. 2. Top roll 18 is mounted on a shaft 20, top roll 19 is mounted on a shaft 21, and the axes of the shafts 20 and 21 also converge towards the inlet end of the bath. The shafts 20 and 21 are driven by driving means 20a and 21a of conventional kind.

The shafts 15 and 16 of the top rolls 13 and 14 are set at an angle of 12° to a line at right angles to the direction of advance of the glass, and the shafts 20 and 21 are both set at an angle of 7°. In one setting the arrangement of FIG. 2 produced a ribbon of float glass 2.7 m wide and 6 mm thick at a lehr speed of 450 m/hr. and a load of 3,040 tonnes per week. The speed of the top rolls 13 and 14 was 333 m/hr. and of the top rolls 18 and 19 was 331 m/hr.

The use of the two pairs of top rolls at different angles was found to lessen any distortion in the glass.

The invention thus provides a new way of operating the float process under high load conditions. The high load conditions may be 3,500 tonnes per week and as high as a load of 4,200 tonnes per week.

The method of the invention can be employed for the production of a range of thicknesses of float glass less than 6 mm thick. For example, when producing glass which is 5 mm thick at high load it has been found preferable to employ a speed of discharge of the ribbon from the bath greater than 450 m/hr. and the method of the invention can be employed to avoid too high a cooling rate. For the production of 4 mm glass even higher speeds of discharge are involved, and especially at discharge speeds greater than 600 m/hr. the invention is advantageously employed.

We claim:

1. In a method of manufacturing flat glass in ribbon form comprising the steps of delivering molten glass onto a bath of molten metal to develop on the bath a layer of molten glass advancing at an initial speed, permitting the advancing layer of molten glass to spread laterally on the bath to attain a first thickness; cooling the glass as it is advanced toward a discharge end of the bath; and, utilizing discharge traction forces applied to the advancing glass adjacent the discharge end of the bath, discharging the advancing glass at a discharge speed greater than said initial speed and at a discharge thickness less than the first thickness; the improvement for increasing the rate of manufacture of said glass comprising:

mechanically applying to the lateral margins of said spread molten glass layer inwardly and forwardly directed forces, which inwardly and forwardly directed forces applied to such spread molten glass layer are applied so as to tend to resist thinning of the glass by
a. enforcing upon the glass a controlled reduction in width while
b. enforcing upon the glass an accelerated advancement to a speed less than the discharge speed;

said enforced controlled reduction in width of the forwardly flowing ribbon of glass being sufficient to establish a glass thickness thereafter reduced to said discharge thickness;

said inwardly and forwardly directed forces being applied while the glass downstream of the application of said inward and forward forces undergoes a further acceleration to said discharge speed in response to said application of discharge forces at said discharge end, to reduce the glass thickness to said discharge thickness.

2. A method according to claim 1 wherein said step of enforcing an accelerated advancement comprises enforcing upon the glass an accelerated advancement to a speed less than the discharge speed and approximately twice said initial speed; and said step of discharging includes discharging said glass at a discharge speed sufficient to reduce the glass layer to a thickness in a range of 5.7 mm to 6 mm.

3. A method according to claim 2 wherein said step of discharging comprises discharging the glass at a discharge speed of approximately 450 mph.

4. A method according to claim 3 wherein said step of applying inwardly and forwardly directed forces comprises applying said forces at two longitudinally spaced locations on each side of said glass layer; the angle of application of the forces relative to glass advancement at the downstream locations being greater than at the upstream locations.

5. A method according to claim 1 wherein said step of applying inwardly and forwardly directed forces comprises the step of engaging the upper surface of said glass layer with driven rollers.

* * * * *